(12) United States Patent
Mirda

(10) Patent No.: US 12,317,902 B2
(45) Date of Patent: Jun. 3, 2025

(54) ENCLOSED AND COLLAPSIBLE MEAT TENDERIZER

(71) Applicant: Kevin Anthony Mirda, Eatontown, NJ (US)

(72) Inventor: Kevin Anthony Mirda, Eatontown, NJ (US)

(*) Notice: Subject to any disclaimer, the term of this patent is extended or adjusted under 35 U.S.C. 154(b) by 31 days.

(21) Appl. No.: 18/181,164

(22) Filed: Mar. 9, 2023

(65) Prior Publication Data
US 2024/0215592 A1    Jul. 4, 2024

Related U.S. Application Data

(60) Provisional application No. 63/477,986, filed on Dec. 30, 2022.

(51) Int. Cl.
| | | |
|---|---|---|
| A22C 7/00 | (2006.01) | |
| A22C 9/00 | (2006.01) | |
| B65D 21/08 | (2006.01) | |
| B65D 43/02 | (2006.01) | |
| B65D 51/24 | (2006.01) | |
| B65D 85/00 | (2006.01) | |

(52) U.S. Cl.
CPC ............ *A22C 9/007* (2013.01); *A22C 7/0023* (2013.01); *A22C 7/0046* (2013.01); *A22C 9/008* (2013.01); *B65D 21/086* (2013.01); *B65D 43/0202* (2013.01); *B65D 51/24* (2013.01); *B65D 85/70* (2013.01)

(58) Field of Classification Search
CPC ....... A22C 7/0023; A22C 7/0046; A22C 9/00; A22C 9/0007; A22C 9/008; A22C 9/007; B65D 21/086; B65D 43/0202

USPC .................................. 452/141, 146, 147
See application file for complete search history.

(56) References Cited

U.S. PATENT DOCUMENTS

| | | | | |
|---|---|---|---|---|
| 1,808,993 | A | * 6/1931 | Norris ..................... | A21C 15/00 425/352 |
| 2,101,755 | A | * 12/1937 | Rosenstone .......... | A22C 7/0076 100/98 R |
| 2,243,492 | A | 5/1941 | Wilson | |
| 2,513,025 | A | 6/1950 | Jackson | |
| 2,718,028 | A | 9/1955 | Melville et al. | |
| 3,294,009 | A | 12/1966 | Di Loreto et al. | |
| 3,492,688 | A | 2/1970 | Godfrey | |
| 3,609,799 | A | * 10/1971 | Lee ....................... | A22C 7/0076 425/441 |
| 3,663,233 | A | 5/1972 | Keszler | |
| 3,716,893 | A | 2/1973 | Vogelsang | |
| 3,837,775 | A | * 9/1974 | Boucher .............. | A22C 7/0076 D7/672 |
| 4,199,841 | A | 4/1980 | Jaccard | |
| 4,436,499 | A | * 3/1984 | Ferrighi .................. | A47J 43/20 425/195 |
| 4,672,716 | A | 6/1987 | Dickey | |
| 4,744,204 | A | * 5/1988 | Schlegel .................. | A23B 4/00 53/526 |

(Continued)

*Primary Examiner* — David J Parsley
(74) *Attorney, Agent, or Firm* — Dunlap Bennett & Ludwig, PLLC

(57) ABSTRACT

A lidded collapsible tub receives meat, and includes a hole in the lid through which a hand-driven tenderizer may repeatedly strike the meat during manual operation, using a piston-like action while the chef holds a rod. Because the container is sealed and walled, there is no splatter. The rod is also hinged, to promote efficient storage after cleaning.

3 Claims, 4 Drawing Sheets

(56) References Cited

U.S. PATENT DOCUMENTS

| | | | | |
|---|---|---|---|---|
| 4,756,505 | A * | 7/1988 | Vegas | A22C 7/0046 |
| | | | | 249/141 |
| 4,815,165 | A | 3/1989 | Gibson | |
| 5,328,403 | A | 7/1994 | Long | |
| 5,445,562 | A * | 8/1995 | Brunell | A22C 7/0046 |
| | | | | 100/283 |
| 5,593,346 | A | 1/1997 | Washington | |
| 6,036,591 | A | 3/2000 | Bonon et al. | |
| 6,869,351 | B1 | 3/2005 | Kell | |
| 7,322,583 | B2 * | 1/2008 | Kim | B62B 5/06 |
| | | | | 280/32.6 |
| 7,744,941 | B2 | 6/2010 | Flood | |
| 7,862,408 | B1 * | 1/2011 | Weinstein | A22C 9/007 |
| | | | | 452/141 |
| 8,857,346 | B2 * | 10/2014 | Khanjian | A47B 3/087 |
| | | | | 108/26 |
| 9,751,660 | B2 * | 9/2017 | Jasin | F41H 3/00 |
| 2006/0078642 | A1 * | 4/2006 | Palese | A22C 7/0046 |
| | | | | 425/416 |
| 2010/0084307 | A1 | 4/2010 | Yeghiayan et al. | |
| 2015/0203285 | A1 * | 7/2015 | Baldo | A47J 31/407 |
| | | | | 426/112 |

* cited by examiner

ENCLOSED AND COLLAPSIBLE MEAT TENDERIZER

RELATED APPLICATIONS

This application claims priority to U.S. Provisional Patent Application No. 63/477,986, filed Dec. 30, 2022, the contents of which are hereby incorporated by reference in their entirety.

FIELD OF THE INVENTION

The present invention is in the field of kitchen products that promote health and sanitation during food preparation.

BACKGROUND OF THE INVENTION

Raw poultry is often contaminated with dangerous pathogens, such as *Salmonella* and *Campylobacter*—leading to sanitation issues around "meat juice." Chen et al., "Contamination by Meat Juice When Shopping for Packages of Raw Poultry," *Journal of Food Protection*, Vol. 81, No. 5, 2018, 835-41. For example, it has been found that consumer shopping practices often include handling meat packages (such as for poultry, and more particularly chicken). Such meat packages often have seeping "meat juice" that remains on consumer hands, shopping bags, and grocery unloading surfaces in the home. Id. This raises the potential of cross-contamination via numerous pathways, particularly leading to contamination of food products that will not be cooked sufficiently to destroy pathogens (e.g., salads).

One potential pathway for contamination comes about during meat tenderizing. Typically a preparation chef (in the commercial or home setting) will use a tenderizer mallet, which has a mallet head containing short pointed cones or pyramids. The hammering process beneficially tenderizes meat for later enjoyment after cooking (e.g., permitting better infusion of marinades or acidic/enzymatic treatments that improve flavor or texture). In a typical tenderizing operation, a chef places poultry or other meat onto a cleanable surface, for example a silicone pad. The chef then lightly hammers as desired. Conscientious chefs will ensure that the surface and the mallet receive proper sanitation and cleaning afterward in order to minimize cross-contamination. However, it is less known that such operations fling meat juice into random, sometimes far-reaching directions in the kitchen. As a result, numerous surfaces unsuspectingly become cross-contamination and disease vectors.

The state of the art in meat tenderizer equipment heretofore took no or insufficient measures to prevent such dangers. For example, U.S. Pat. No. 5,593,346 discloses a meat tenderizing mallet. While the disclosed mallet advantageously has means to put tenderizing fluid into the mallet to cause injection through pyramidic projections through the meat, no measures are taken to prevent juice splatter during the hammering operation.

U.S. Pat. No. 6,869,351 discloses a tray for tenderizing and marinating meats. The tray has tines, which pierce through meat placed upon them. A pool of marinade may reside in the tray, thus promoting absorption through wicking. This patent does not disclose splatter being minimized using this system, likely because no striking or hammering mechanism exists within it in the first place. It also does not benefit from the kind of true tenderizing action that chefs and diners prefer, which can only come about through controlled manual repetitive striking at the meat flesh.

U.S. Pat. No. 3,492,688 appears to be callously indifferent to splatter risk. Liquid fills a container, and meat is positioned within the liquid. A high explosive means beneath the surface of the liquid and adjacent the meat is detonated, sending a shock pressure wave within the liquid for tenderizing purposes. No mallet striking action is involved. One also wonders how such a container might consistently survive repeated blasts, and resist exploding meat juice in all directions.

Chefs traditionally have placed clear plastic wrap around meat, or otherwise placed meat in a press-seal bag, before pounding. While these rudimentary actions may achieve some success in preventing splatter, they promote waste and carry a risk of chemical contamination from the wrap or bag material infusing into the meat. They also disadvantageously place a barrier layer between the contacting studs and the meat, either reducing effectiveness of the tenderizing action or introducing a factor requiring the chef to increase the strength of pounding to an extent that will be unknown from situation to situation.

It is an object of the invention to overcome the disadvantages of the prior art, and provide a safe and sanitary device for tenderizing meat and preventing meat juice splatter, for both commercial and home environments.

SUMMARY OF THE INVENTION

A lidded container receives meat, and includes a hole in the lid through which a hand-driven pounder may repeatedly strike the meat during manual operation, using a piston-like action while the chef holds a rod. The pounder end has sufficient conical or pyramidic studs to tenderize the meat's surface. Because the container is sealed and walled, there is no splatter. The container also advantageously is collapsible, and rod is hinged, to promote efficient storage after cleaning.

DETAILED DESCRIPTION OF THE PREFERRED EMBODIMENTS

The following detailed description is exemplary and not intended to be limiting. The scope of the present invention is defined by each of the respective claims that follow.

Figure 1:
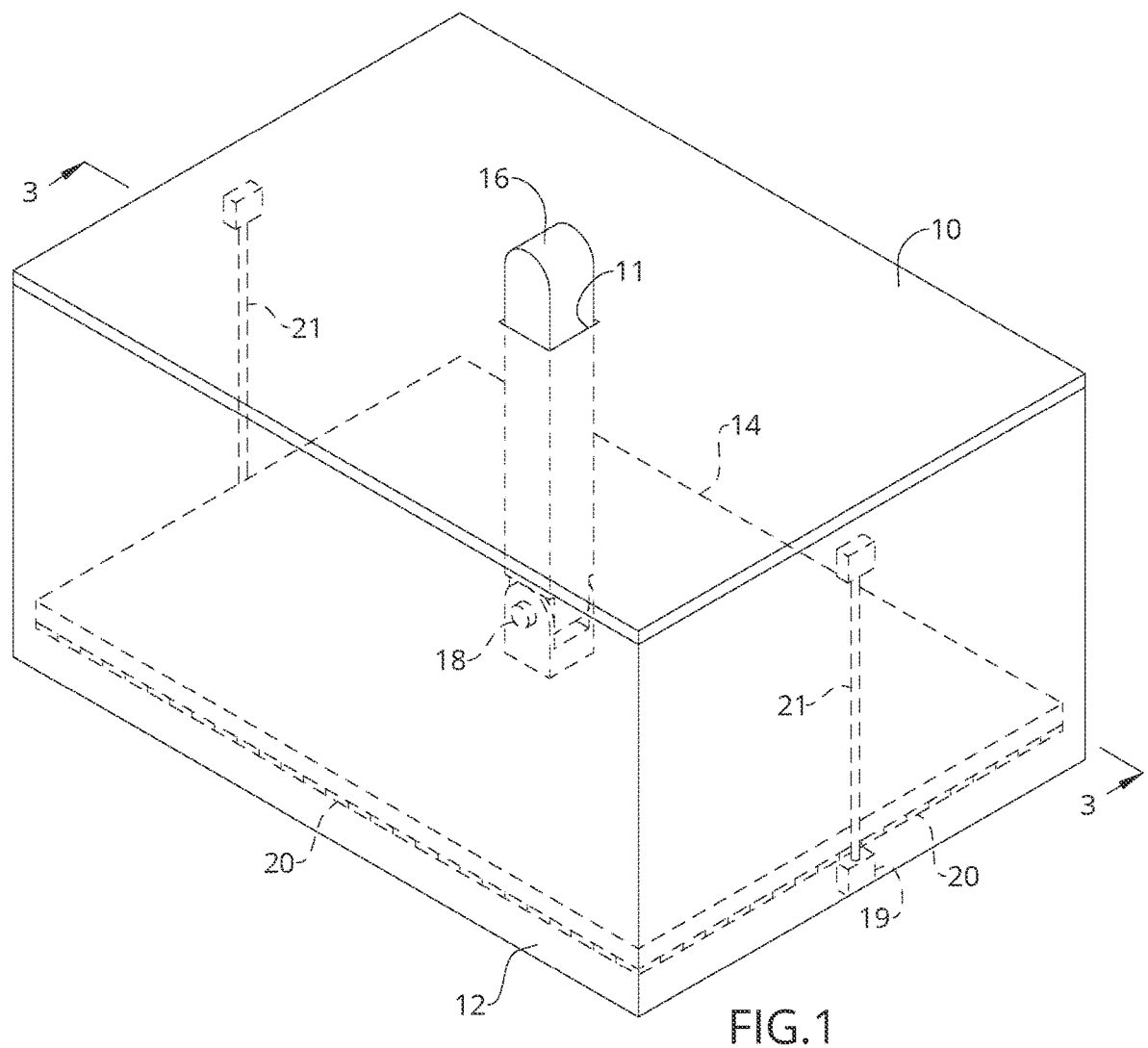
FIG. 1 is a perspective view of the invention.

FIG. 1 shows a container consisting of a lid 10 and tub 12. The lid has a substantially centered hole 11. When fully configured for use, rod 16 communicates through hole 11, so that during hand-held use, a chef may freely move rod 16 up and down in a piston action. Preferably a sealing means as known in the art (not shown) exists around the periphery of hole 11, so that such piston action can occur without any liquid inside tub 12 getting out through the hole 11/rod 16 interface. The opposite/bottom end of rod 16 connects to contact tenderizer 14, which in turn contains studs 20 on the meat-contacting side (such studs being conical, pyramidic, or other shapes known in the art).

Figure 2:
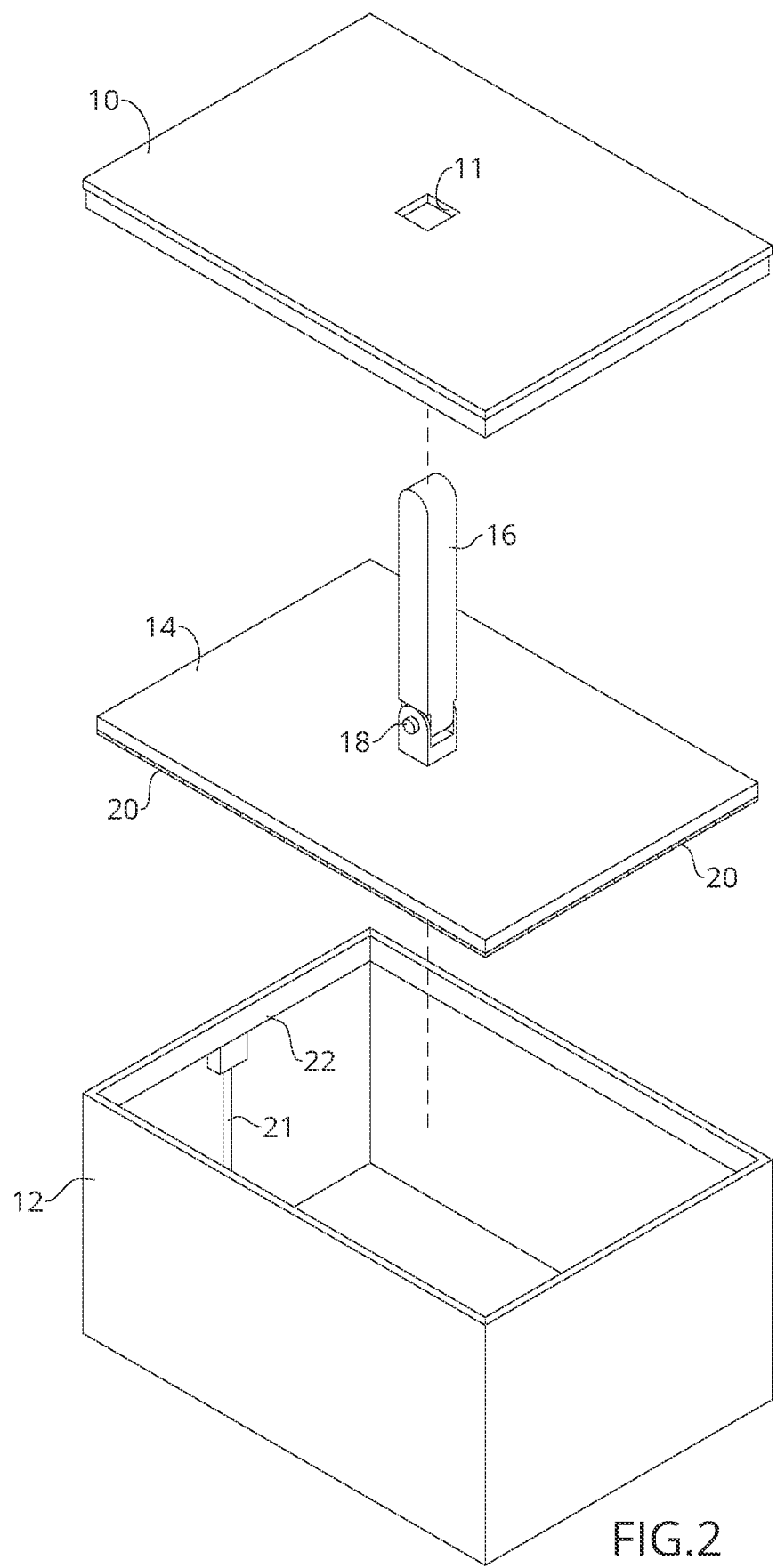
FIG. 2 is an exploded view of the invention.

FIG. 2 shows the same container and rod/tenderizer in exploded view, while also showing rim reinforcement 22, which functions as a sturdier lip for resting the lid 10. Shown in both FIGS. 1 and 2 is also button release 18 that exists at a hinged division of rod 16. As will be described, this manually-operated button release transitions the rod from straight to bent at 90 degrees, for easier storage of the entire system when not in use. It uses a snap-engagement as is known in the art, to make the rod stable and vertical when in operating mode, whereby pushing on button release 18 is necessary to permit the hinged bending. Shown in FIGS. 1 and 2 are also holding rods 21, that hingedly engage the bottom of tub 12 at the location of specially placed divots 19 when tub 12 is expanded from its initial collapsed (storage) configuration, as will be herein later described.

FIGS. 3-6 demonstrate in section view along line 3-3 of FIG. 1 how a chef will use the container/tenderizer combination. Note that in each such figure, holding rods 21 are assumed to be hinged downward to keep the entire container in expanded mode.

Figure 3:
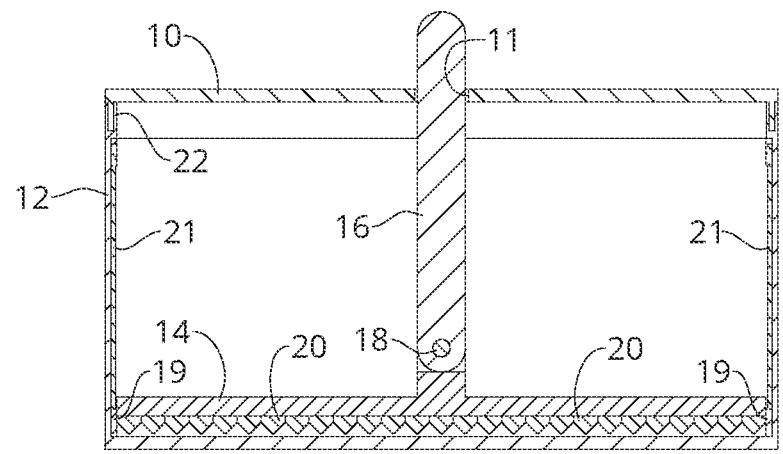
FIG. 3 is a section view taken along 3-3 in FIG. 1.
Figure 4:
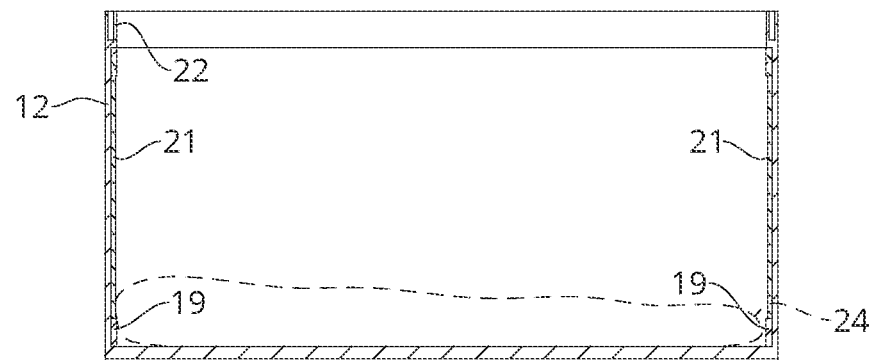
FIG. 4 is a section view with the lid and tenderizer removed.
Figure 5:
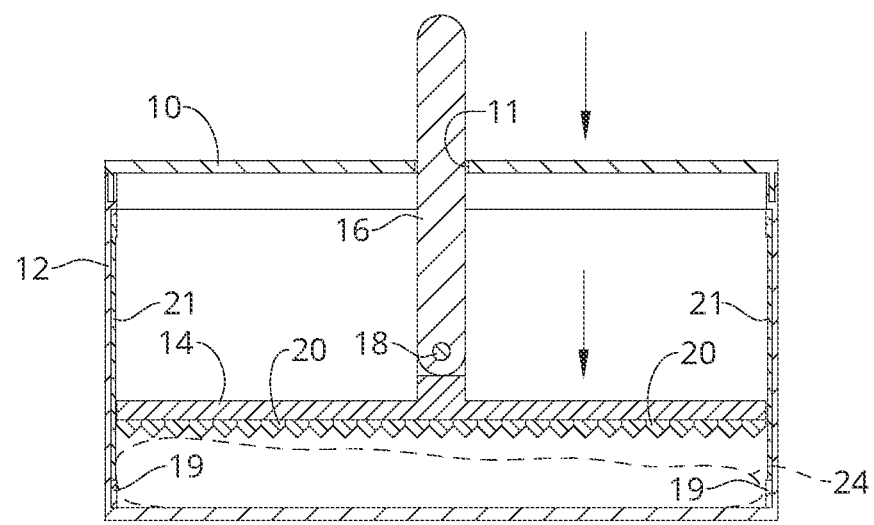
FIG. 5 is a section view showing the down motion of the tenderizer.
Figure 6:
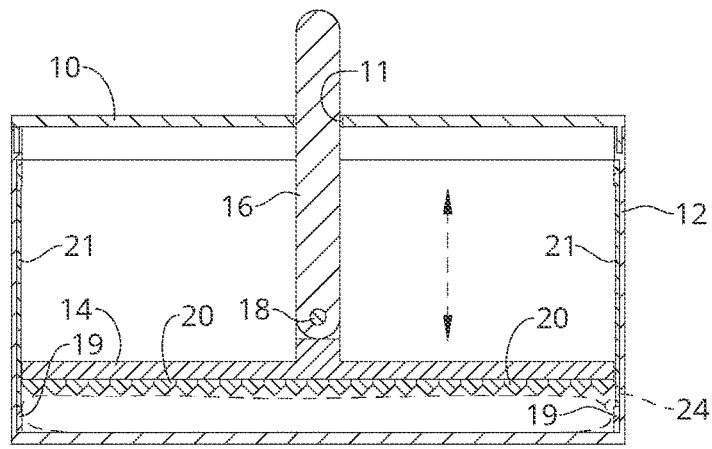
FIG. 6 is a section view showing the motion of the tenderizer.

In FIGS. 3 and 5-6, the lid 10 is placed on the tub 12, and the rod 16 projects upward through the hole 11. FIG. 3 shows the arrangement with the rod 16 and tenderizer 14 slid fully down into tub 12, without any meat inside the tub 12. FIG. 4 shows how exemplary meat 24 might rest on the bottom of tub 12. FIG. 5 shows an initial downward drive (e.g., via hand force) of the rod 16 and tenderizer 14, in slidable action along and through lid hole 11. Note that meat 24 exists entirely within tub 12 during this action in which studs 20 impinge upon the meat, and any meat juice will be blocked by tub interior surfaces and by tenderizer 14 itself. FIG. 6 now shows up and down motion on the meat that would ensue in normal use for the chef to complete the tenderizing action.

Figure 7:
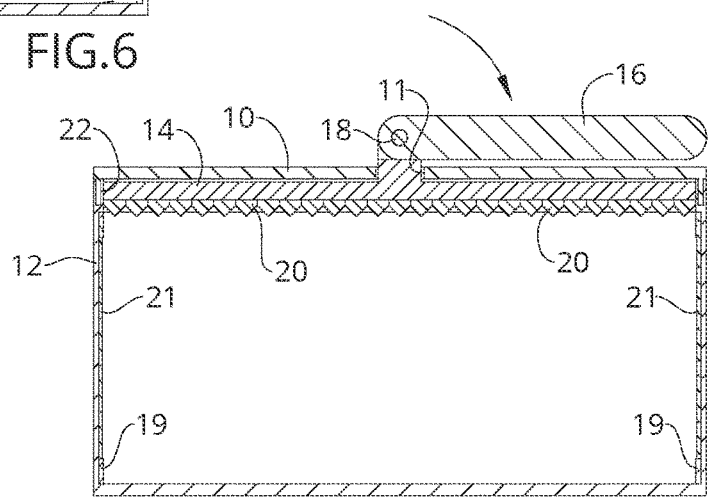
FIG. 7 is a section view showing the motion of the rod.

FIG. 7 is another section view demonstrating bendability of rod 16. To achieve the result shown, a chef (presumably working with a now-clean empty system) would pull up the tenderizer 14 to touch the lid 10. Then button release 18 will be engaged to allow bending of rod 16 along the hinged axis. This now allows stable union and storage of the lid 10 and rod 16/tenderizer 14 combination. As shown in FIG. 7, this combination rests on an extended tub 12.

Figure 8:
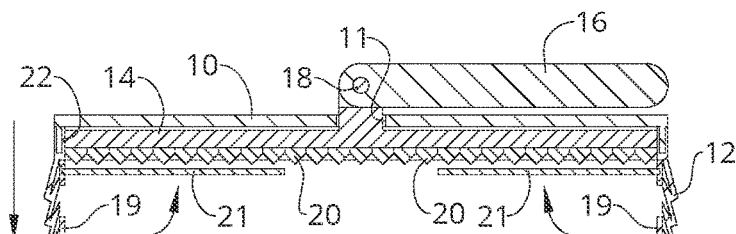
FIG. 8 is a section view showing the tub collapsed.
Figure 9:
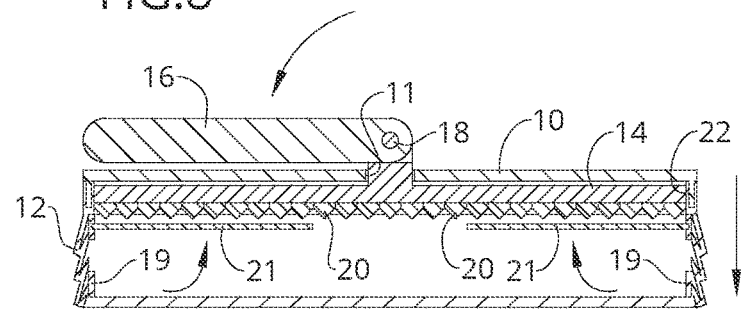
FIG. 9 is a section view showing the handle moved to the opposite side.

Most preferably, storage would occur in the collapsed state, as shown in FIGS. 8 and 9. In the collapsed state, tub 12 is shown to be built from lapped segments that together make up its walls. This is similar to the principle used for collapsible laundry baskets or the like. Such segments are constructed to slightly bias each segment material outward, such that the unconstrained state of the tub 12 would naturally lead to the lapping configuration, thus collapsing into a minimum volume. In this state, holding rods 21 are hinged to be out of the way of such collapsing action, and will clip into such out of the way position via clips (not shown) that angle them upward and horizontally. Conversely, expansion of tub 12 involves pulling up by hand on rim 22 to oppose the lap segments' natural bias, then unclipping holding rods 21 to force them to engage from the rim 22 to the bottom of tub 12 at divots 19, to force a stable counter-biased expansion state. When holding rods 21 are so engaged, they remain outside the movement area of tenderizer 14. It will also be appreciated that, as shown in the present embodiment, holding rods 21 are roughly half the dimension of the width or length of tub 12, thus constraining the depth of tub 21 to be about half of either the width or length dimension (whichever one is used to contain holding rods 21). Meanwhile, each lapped segment may be supplied with a gasket-forming material on its surface (e.g., edges of soft silicone), to ensure a good seal all around the tub 12 in its expanded state. FIGS. 8 and 9 differ, only in that rod 16 may be hinged in either of two directions to form its 90 degree storage angle.

Any food-safe and sanitizable material can make up the construction materials of any of the foregoing parts, such as silicone, nylon plastic, stainless steel, copper, etc. Also, while a generally rectangular cubic shape for tub 12 and cooperating parts has been shown in the drawing figures, the invention is not limited to such shapes, and any partially or fully curved shape for any such pieces may be within the scope of this invention. Likewise, while tenderizer 14 is shown to take up essentially all of the depth cross-section of tub 12, this is not necessary for the invention to work and achieve its full sanitary benefits—that is, a smaller profile will also work, while preventing meat juice splatter outside tub 12 and lid 10.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

I claim:

1. A meat pounder tenderizer apparatus comprising:
   a tub having a top rim and one or more sidewalls;
   a lid configured to sealingly engage the top rim of the tub, the lid comprising a hole;
   a rod and pounder tenderizer coupled combination, the rod passing through the hole, and the pounder tenderizer comprising a plurality of studs on a surface, wherein slidable engagement of the rod through the hole allows up-and-down movement of the studs on the pounder tenderizer within the tub;
   wherein the one or more sidewalls comprise overlappable segments, and
   wherein the tub comprises an expanded state where the segments of the one or more sidewalls do not overlap, and a collapsed state where the segments of the one or more sidewalls do overlap such that at least one segment extends past and covers a part of at least one other segment;
   wherein the tub further comprises one or more holding rods, wherein the one or more holding rods each engage the tub in the expanded state to stabilize the tub against changing to the collapsed state, wherein the one or more holding rods in the collapsed state hingeably move to be out of the way,
   the one or more holding rods further comprising a hinge axis and a button release, wherein the button release permits the one or more holding rods to hinge on its hinge axis to an angle parallel the lid during storage; and
   further wherein the lid and the one or more holding rods while hinged to be parallel the lid are capable of engaging onto the top rim of the tub while the tub is in its collapsed state,
   whereby, any meat within the tub may be tenderized through contact with the studs without meat juice splattering outside the tub, and whereby the apparatus may be stored with a reduced volume during non-use.

2. The apparatus of claim 1, wherein the lapped segments are biased outward to promote overlap during the collapsed state.

3. The apparatus of claim 1, wherein the one or more holding rods clip into place when they move to be out of the way in the collapsed state.

\* \* \* \* \*